E. M. ATKINSON.
COOKING AND HEATING DEVICE.
APPLICATION FILED MAR. 9, 1916.

1,223,552.

Patented Apr. 24, 1917.

INVENTOR
Edward M. Atkinson

UNITED STATES PATENT OFFICE.

EDWARD M. ATKINSON, OF PORTLAND, OREGON.

COOKING AND HEATING DEVICE.

1,223,552.  Specification of Letters Patent.  Patented Apr. 24, 1917.

Application filed March 9, 1916. Serial No. 83,060.

*To all whom it may concern:*

Be it known that I, EDWARD M. ATKINSON, a citizen of the United States, and a resident of Portland, county of Multnomah, State of Oregon, have invented a new and useful Improvement in Cooking and Heating Devices, of which the following is a specification.

This invention relates to an improved type of cooking and heating device adapted to be used in connection with a cooking or heating stove, said device being so constructed as to obtain maximum efficiency from the heat thrown off by the fire in the stove. In all of the usual types of stoves, the radiating surface is adapted wholly for heating purposes, and when such stove is to be used for cooking it is necessary to build the fire high and close to the top, in order to heat cooking devices placed on top of the stove.

One of the main objects of my invention is to provide a receptacle adapted to be adjustably seated in the top opening of a stove, which, when used for heating purposes, will provide a greatly enlarged radiating surface, and when so used may be adjusted so as to extend down into the stove close to the fire. In this way a small fire will be highly efficient. Furthermore, this device provides a means for increasing the efficiency of combustion in the stove by retarding the passage of gases into the flue. A further object is to provide improved means for ventilating this receptacle when the latter is covered and used for cooking purposes.

Figure 1:
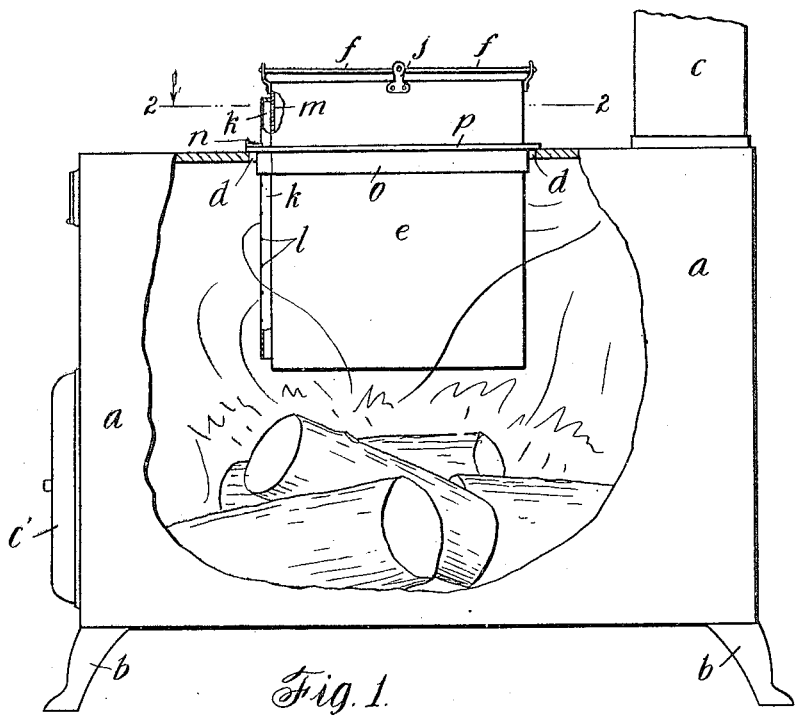
Figure 1 is a side elevation, partly in section, of an air-tight heater of usual construction, showing my device used in connection therewith.
Figure 2:
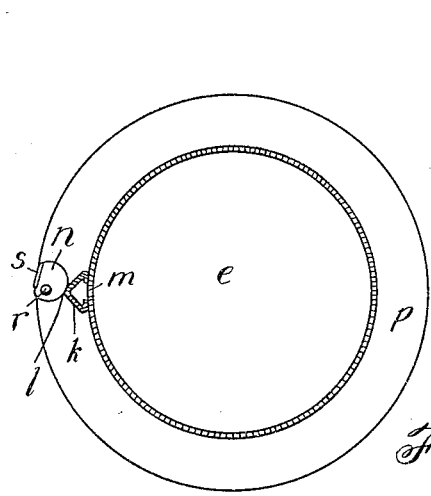
Fig. 2 is a larger-scale sectional view taken on the line 2—2 of Fig. 1.
Figure 3:
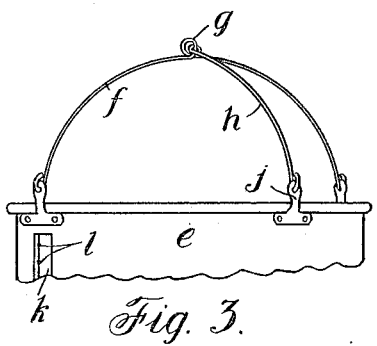
Fig. 3 is a fragmental elevation showing the bail which I find it convenient to use with my device.

$a$ represents the stove, $b$ are the legs, $c$ the stove-pipe, $c'$ is the clean-out door, and in the upper portion of the stove is an opening $d$ through which the fuel is placed. My invention consists of a cylindrical receptacle $e$, the upper end of which is open and is provided with a pivoted bail $f$, having at its center point an eye $g$. An auxiliary strut $h$ is loosely connected to the eye $g$, and its free end is adapted to be removably engaged with a bracket $j$ fixed on the side of the receptacle. This structure permits the bail to be propped in the position shown in Fig. 3, and also permits these parts to be collapsed to the position shown in Fig. 1. The receptacle $e$ is provided on one side with a triangular cross-sectioned tubular member $k$, the upper end of which is closed, the lower end being open, as shown in Fig. 1, and the upper end of this tube is connected with the interior of the receptacle by an orifice $m$. The outside of this member $k$ is provided with a plurality of small notches $l$ which are adapted to form seats for a locking washer $n$. A sleeve $o$ is adapted to have a close sliding fit on the receptacle $e$, said sleeve being notched so as to fit over the tube $k$. The sleeve $o$ is further provided with a flange $p$, of considerable width, which is adapted to seat on the top of the stove around the fuel opening $d$ in which the receptacle is placed. The depth to which this receptacle is adjusted into the stove may be regulated by sliding it to any desired position, and then locking it in such position. The locking feature which I find it convenient to use is illustrated in Fig. 2 and consists of a washer $n$ pivoted eccentrically on a rivet $r$ and having one edge turned up as indicated by $s$. When this washer is rotated to the proper position it will engage one of the notches $l$ of the tube $k$ and will hold said receptacle firmly in such adjusted position with respect to the sleeve $o$. By making the flange $p$ wide, this receptacle may be made to fit any sized hole of the stove, and is therefore equally adaptable for any type or size of stove. When used for heating purposes the increased radiating surface enables a higher degree of heat to be utilized, and at the same time the portion of the receptacle projected inside the stove will serve to retard the passage of gases through the chimney. When this device is used, it may be projected into the stove as deep as necessary to bring the bottom of the receptacle into close relationship with the fire. The bail shown in Fig. 3 is particularly useful because, when used for heating purposes, the usual cover for the fuel hole $d$ may be placed on top of it and will serve as a deflector to facilitate the circulation of heat. When used for cooking purposes, and the receptacle is covered, the ventilating tube $k$ will carry the fumes back into the stove and eliminate the disagreeable odor usually attendant upon the cooking process.

I claim:

1. A device of the character described comprising a cylindrical receptacle provided with an open upper end, a tube extending longitudinally of the receptacle, the lower end of said tube being open, and the upper end in communication with the interior of the receptacle, the exterior of the tube being made with a plurality of notches, a flanged sleeve slidably mounted on the receptacle, and a locking member pivoted on the flange of the sleeve and adapted to engage one of the notches of the tube so as to lock the sleeve and receptacle in any relative position to which they have been adjusted.

2. A device of the character described comprising a cylindrical receptacle provided with an open upper end, a tube extending longitudinally of the receptacle, the lower end of said tube being open, and the upper end in communication with the interior of the receptacle, the exterior of the tube being made with a plurality of notches, a flanged sleeve slidably mounted on the receptacle, and an eccentric locking member pivoted on the flange of the sleeve and adapted to engage one of the notches of the tube so as to lock the sleeve and receptacle in any relative position to which they have been adjusted.

3. A device of the character described comprising a cylindrical receptacle provided with an open upper end, a tube of triangular cross-section extending longitudinally of the receptacle, the lower end of said tube being open, and the upper end in communication with the interior of the receptacle, the exterior of the tube being made with a plurality of notches, a flanged sleeve slidably mounted on the receptacle, and a locking member pivoted on the flange of the sleeve and adapted to engage one of the notches of the tube so as to lock the sleeve and receptacle in any relative position to which they have been adjusted.

4. A device of the character described comprising a cylindrical receptacle provided with an open upper end, a tube of triangular cross section extending longitudinally of the receptacle, the lower end of said tube being open, and the upper end in communication with the interior of the receptacle, the exterior of the tube being made with a plurality of notches, a flanged sleeve slidably mounted on the receptacle, and an eccentric locking member pivoted on the flange of the sleeve and adapted to engage one of the notches of the tube so as to lock the sleeve and receptacle in any relative position to which they have been adjusted.

EDWARD M. ATKINSON.